US006220567B1

(12) United States Patent
Buelow

(10) Patent No.: US 6,220,567 B1
(45) Date of Patent: Apr. 24, 2001

(54) INTERLOCK MECHANISM FOR CONTROLLING ATTACHMENT TO A WORK VEHICLE

(75) Inventor: Jonathan L. Buelow, Woodridge, IL (US)

(73) Assignee: Case Corporation, Racine, WI (US)

(*) Notice: Subject to any disclaimer, the term of this patent is extended or adjusted under 35 U.S.C. 154(b) by 0 days.

(21) Appl. No.: 09/407,203

(22) Filed: Sep. 28, 1999

(51) Int. Cl.[7] .............................. F16K 35/00; F02F 3/28

(52) U.S. Cl. .............................. 251/90; 414/685

(58) Field of Search .............................. 251/90, 92, 93; 414/685; 92/15, 20

(56) References Cited

U.S. PATENT DOCUMENTS 4,011,959 3/1977 Papasideris .............................. 214/762
4,793,378 12/1988 Loeffler et al. .............................. 137/560

*Primary Examiner*—Kevin Shaver
*Assistant Examiner*—Eric Keasel
(74) *Attorney, Agent, or Firm*—Foley & Lardner

(57) ABSTRACT

There is provided in accord with the present invention a work vehicle having a fluid actuated and mechanically linked attachment, which attachment is operatively connected to a valve having a control valve spool reciprocally mounted in the control valve body and having a control valve lock mounted thereon. The control valve lock comprises a rod engaged at one end with the valve spool and having a groove at the other end, with the rod maintaining a centering spring assembly in contact with the valve spool. An actuator, such as a solenoid, is mounted and orientated normal to the rod. The actuator, such as a solenoid, has a pin aligned to selectively engage the groove in the rod. The solenoid is in operative communication with a control switch to selectively operate the solenoid.

25 Claims, 7 Drawing Sheets

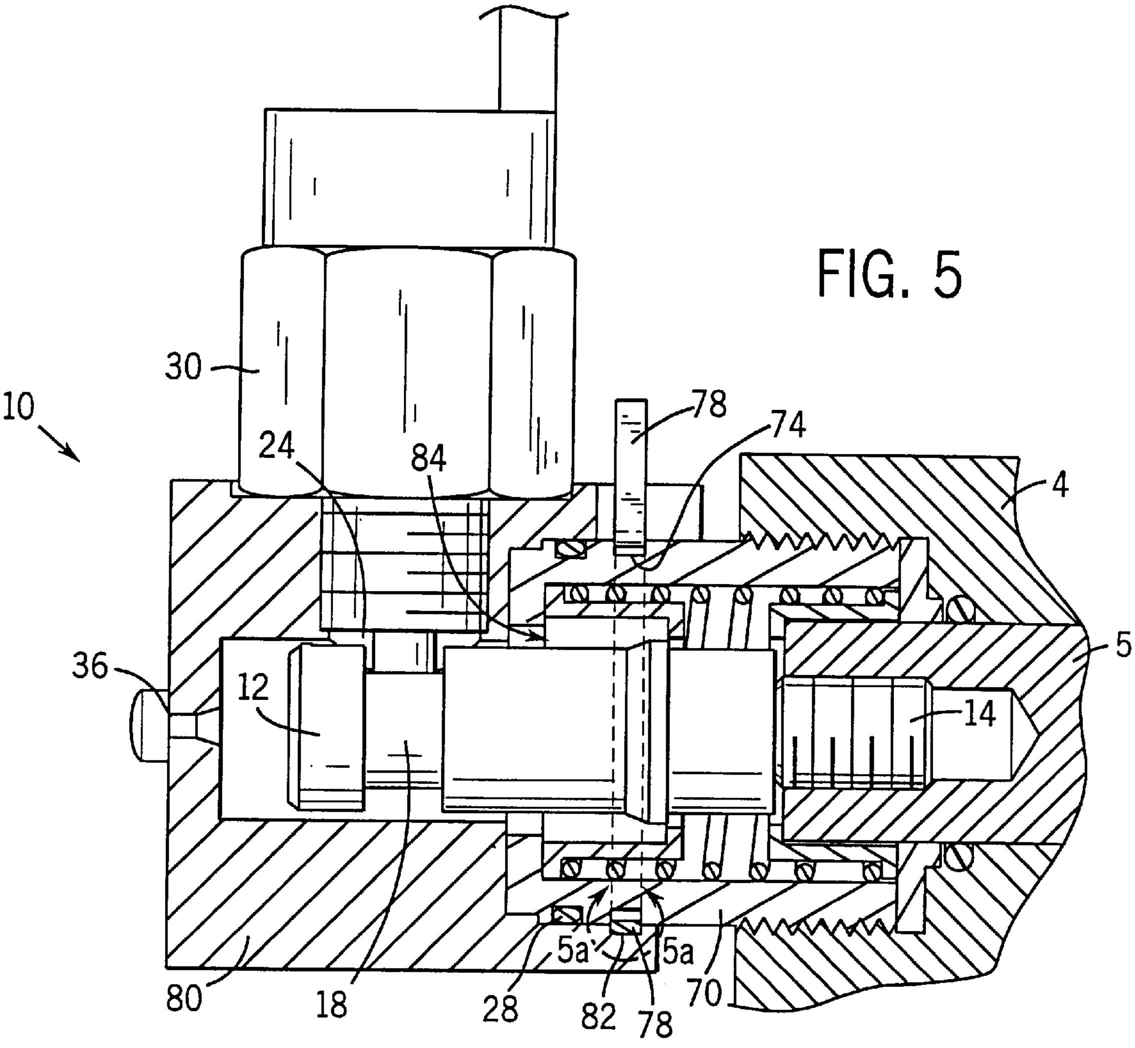
FIG. 5
FIG. 5a
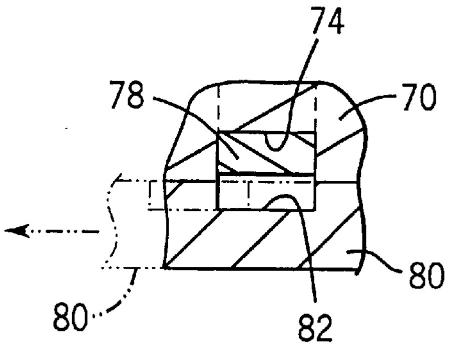

INTERLOCK MECHANISM FOR CONTROLLING ATTACHMENT TO A WORK VEHICLE

FIELD OF THE INVENTION

The present invention relates to control of fluid actuated and mechanically linked implements and attachments on work vehicles, such as backhoe, skid steers, front end loaders, hydraulic cranes, etc. In particular, the present invention relates to an interlock mechanism to prevent movement of the work vehicle attachments without selective control by an operator of the work vehicle.

BACKGROUND OF THE INVENTION

Currently used hydraulically activated work vehicles, such as backhoes, front end loaders, skid steers, hydraulic cranes, etc. use fluid control valves to direct the motion of various functions on these machines, such as swinging, booming, bucket dipping and bucket rotation. These control valves allow fine control of the various functions as the associated valve spool is moved to and from its neutral position.

The typical function of hydraulic equipment currently uses valve timing, which is either slightly metered in, neutral or slightly metered out. Typically, valve designers avoid the use of heavy metering in or heavy metering out functions as a result of energy considerations. More specifically, depending upon the amount of metering, energy can be wasted since high metering restrictions usually result in the operation of the hydraulic pump such that the associated driving engine has to generate additional power to force fluid through restrictions associated with heavy metering. However, there are certain functions on hydraulic equipment, such as a backhoe, which are usually operated at relatively high pressures (e.g., the swinging motion), or having an overrunning load (e.g., the hydraulics associated with a boom) which have a potential to generate pressure appropriate to generate a metering out conditions. Most control valves have a spool which has metering notches which meter the flow when there is partial movement of the spool. Maintaining the control valve spool in a neutral position to prevent unwanted movement of a backhoe function resulting from fluid flow and pressure build-up through the spool metering notches is an important and desirable characteristic.

Existing devices for control valve locks include mounting a solenoid directly to the valve body to allow the solenoid rod to engage a recess in the valve spool. Locking of control valve spools using solenoids, in the part, required extensive use of levers as shown in U.S. Pat. No. 4,011,959. An alternative means for locking a valve spool in a desired location is use of a pin engaging a recessed area in the valve spool as disclosed in U.S. Pat. No. 4,793,378. Such arrangements require redesign of existing valve bodies to accommodate such locking devices which is expensive and in some cases not possible because of alignment difficulties. Retro-fitting control valves on equipment already in the market cannot be easily or inexpensively accomplished if the solenoid must be mounted on the control body.

Thus, there is a need for an interlock mechanism that will maintain a control valve spool in a neutral position to prevent fluid flow pressure from operating any of the work vehicle functions without selective control by an operator of the work vehicle. There is also a need for an interlock mechanism that can lock the control valve spool in a neutral position without mounting the actuator directly on the valve body. There is a further need for the ability to retro fit existing control valves with a valve lock without a complete redesign or extensive modifications to the valve body.

SUMMARY OF THE INVENTION

There is provided in accord with the present invention a work vehicle having a fluid actuated and mechanically linked attachment, which attachment is operatively connected to a valve having a control valve spool reciprocally mounted in the control valve body and having a control valve lock mounted thereon. The work vehicle may have four wheels, with 2 or 4 wheel drive and can also be an articulated vehicle or a tracked vehicle. The control valve lock comprises a rod engaged at one end with the valve spool and having a groove at the other end, with the rod maintaining a centering spring assembly in contact with the valve spool. An actuator, such as a solenoid, is mounted and orientated normal to the rod. The actuator or a solenoid has a pin aligned to selectively engage the groove in the rod. The solenoid is in operative communication with a control switch to selectively operate the solenoid.

The control valve lock can be mounted on the control valve body in several ways. In one embodiment a solenoid is mounted in a solenoid block which is mounted on the valve body. In another embodiment, a solenoid is mounted on an outer cap, which fits over an inner cap. The inner cap is mounted on the valve body. A retainer ring engages a corresponding groove in each of the outer cap and the inner cap to secure the outer cap to the inner cap. An additional embodiment mounts a solenoid to a lock block that is removably mounted to a mounting plate. The mounting plate is supported between the valve body and the lock block by an inner cap that threadingly engages the valve body.

BRIEF DESCRIPTION OF THE DRAWINGS

FIG. 5 is a side sectional view of the assembled and mounted interlock mechanism shown in FIG. 4 and illustrating the retainer ring in an uncompressed state.

FIG. 5*a* is a detail side sectional view illustrating the retainer ring in a compressed state.

Figure 1:
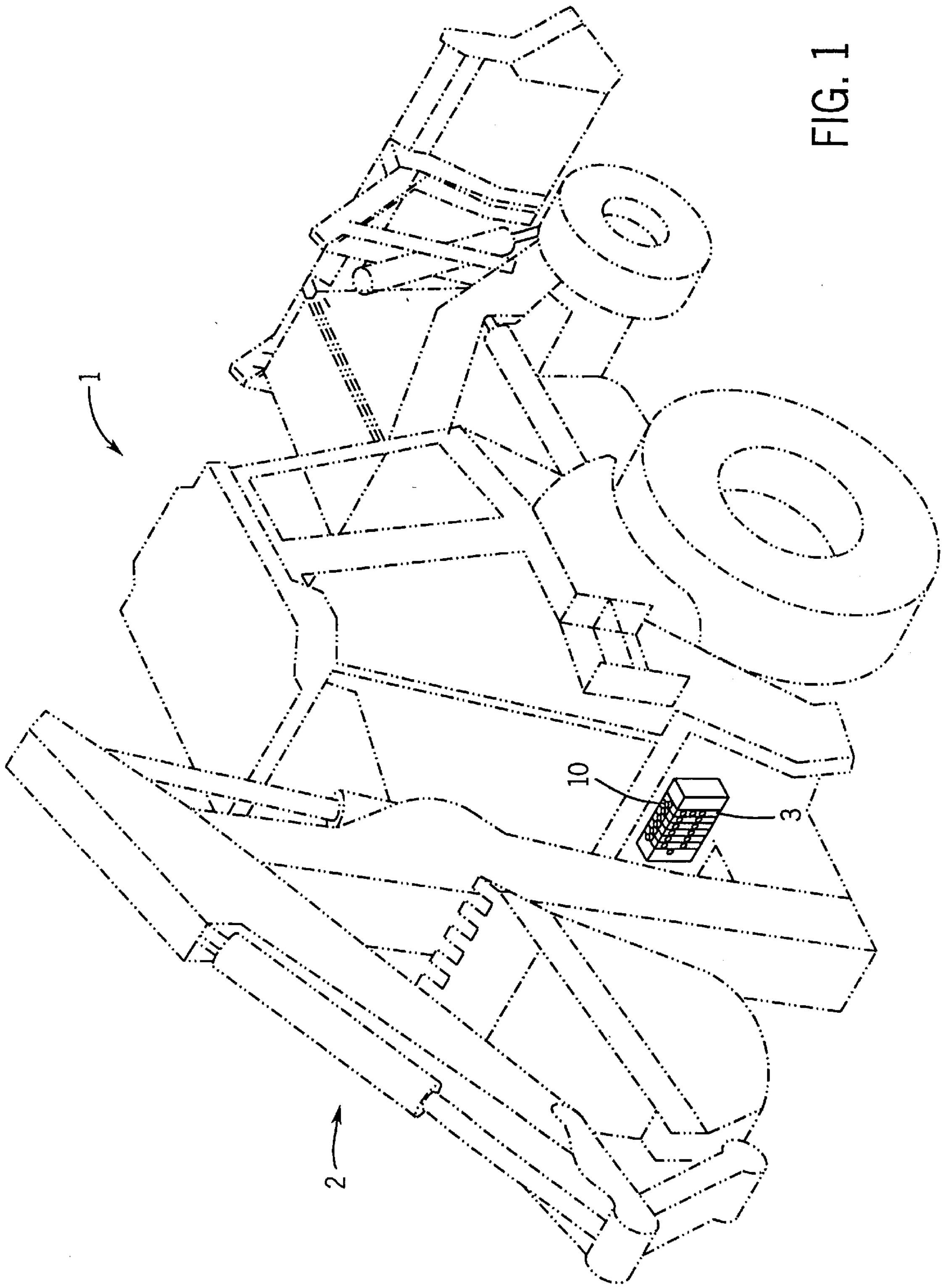
FIG. 1 is an illustration depicting the interlock mechanism of the present invention mounted on a control valve used to control the swing function of a backhoe mounted on a work vehicle.

Before explaining the preferred embodiment of the invention in detail, it is to be understood that the invention is not limited in the application to the details of construction and the arrangement of components set forth in the following description or as illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENT

Figure 2:
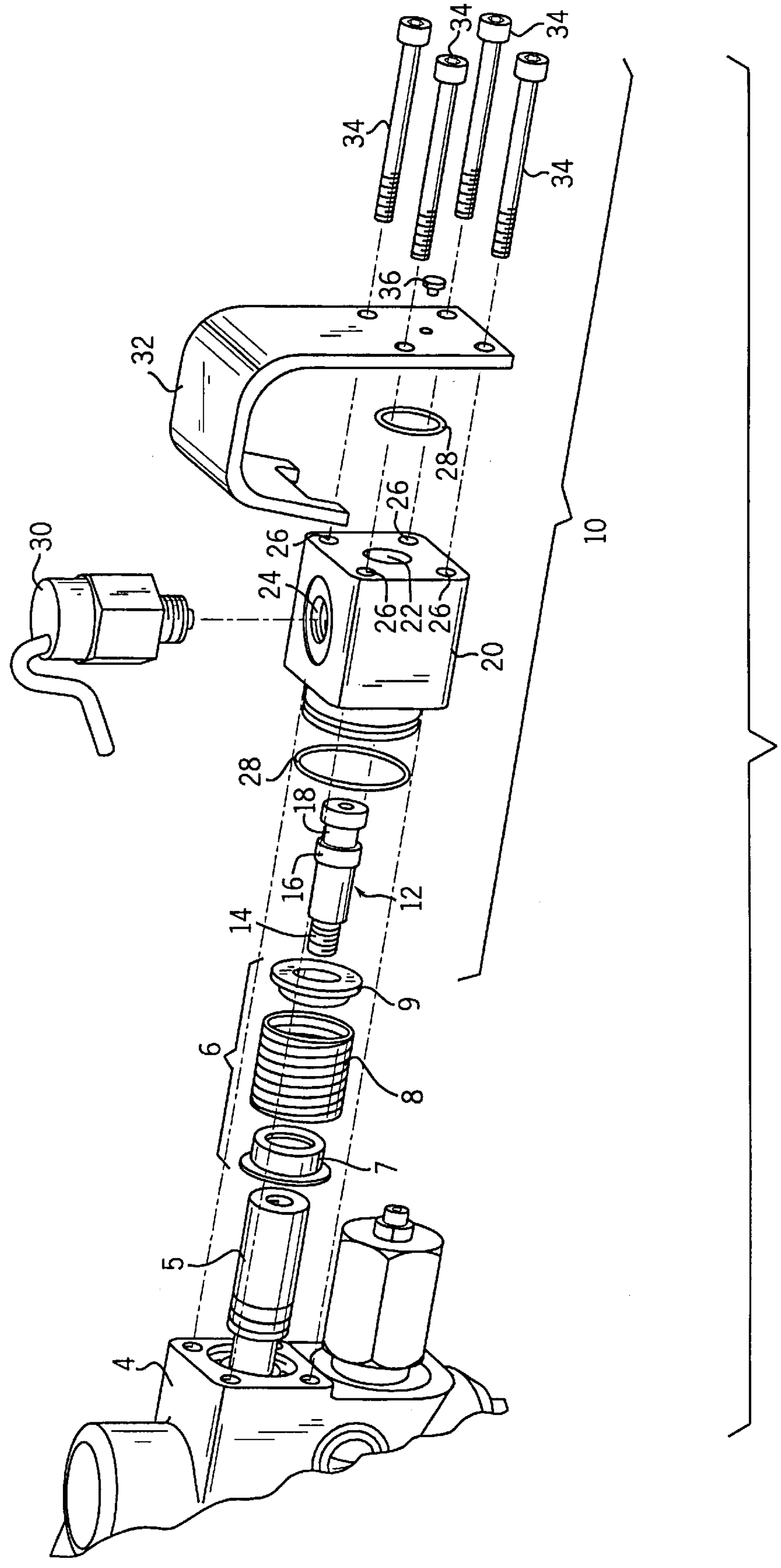
FIG. 2 is an exploded, perspective view of one embodiment of the interlock mechanism of the present invention, which interlock mechanism is attached by bolts to the valve body of the control valve.
Figure 3:
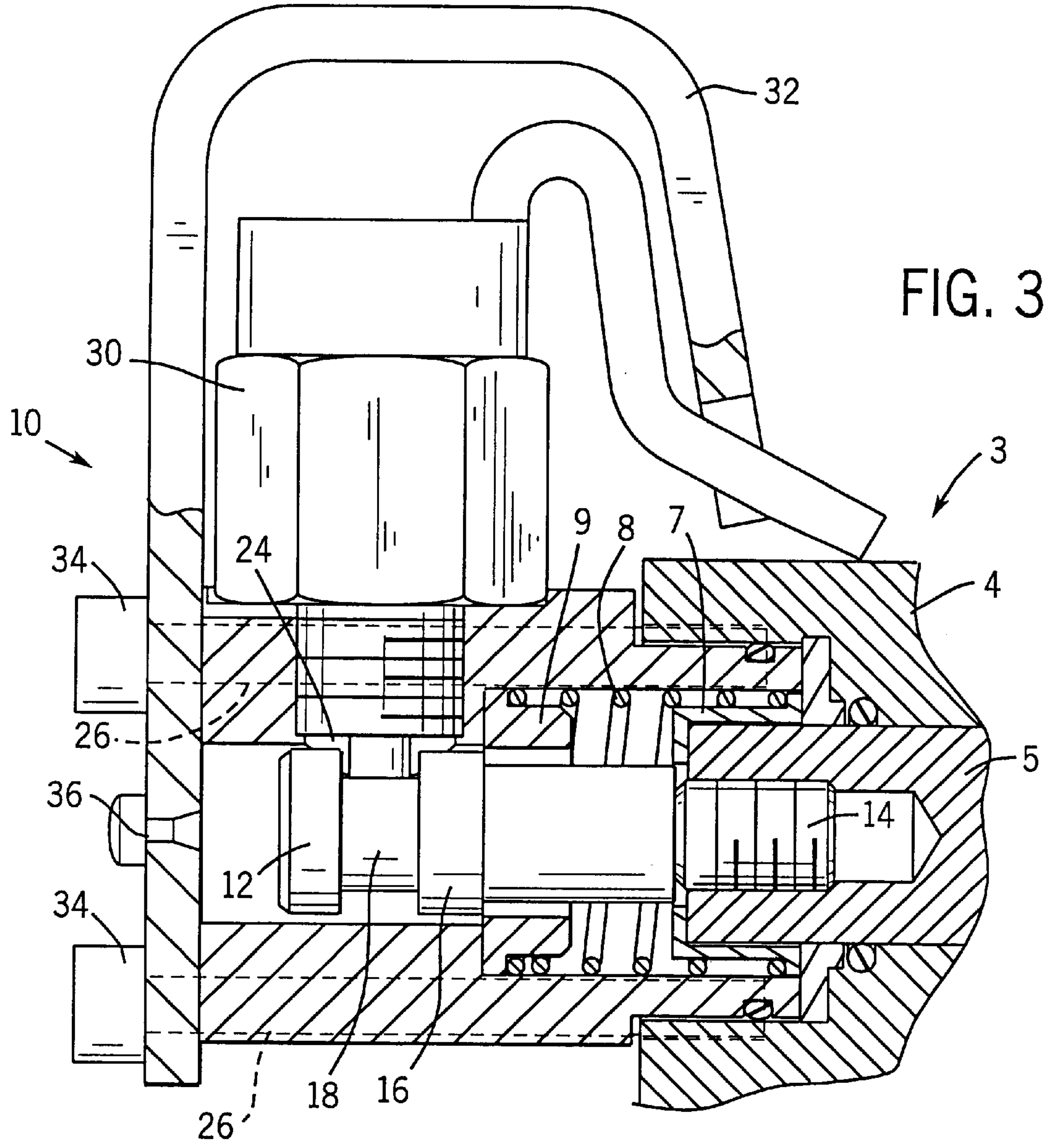
FIG. 3 is a side sectional view of the assembled and mounted interlock mechanism shown in FIG. 2.
Figure 4:
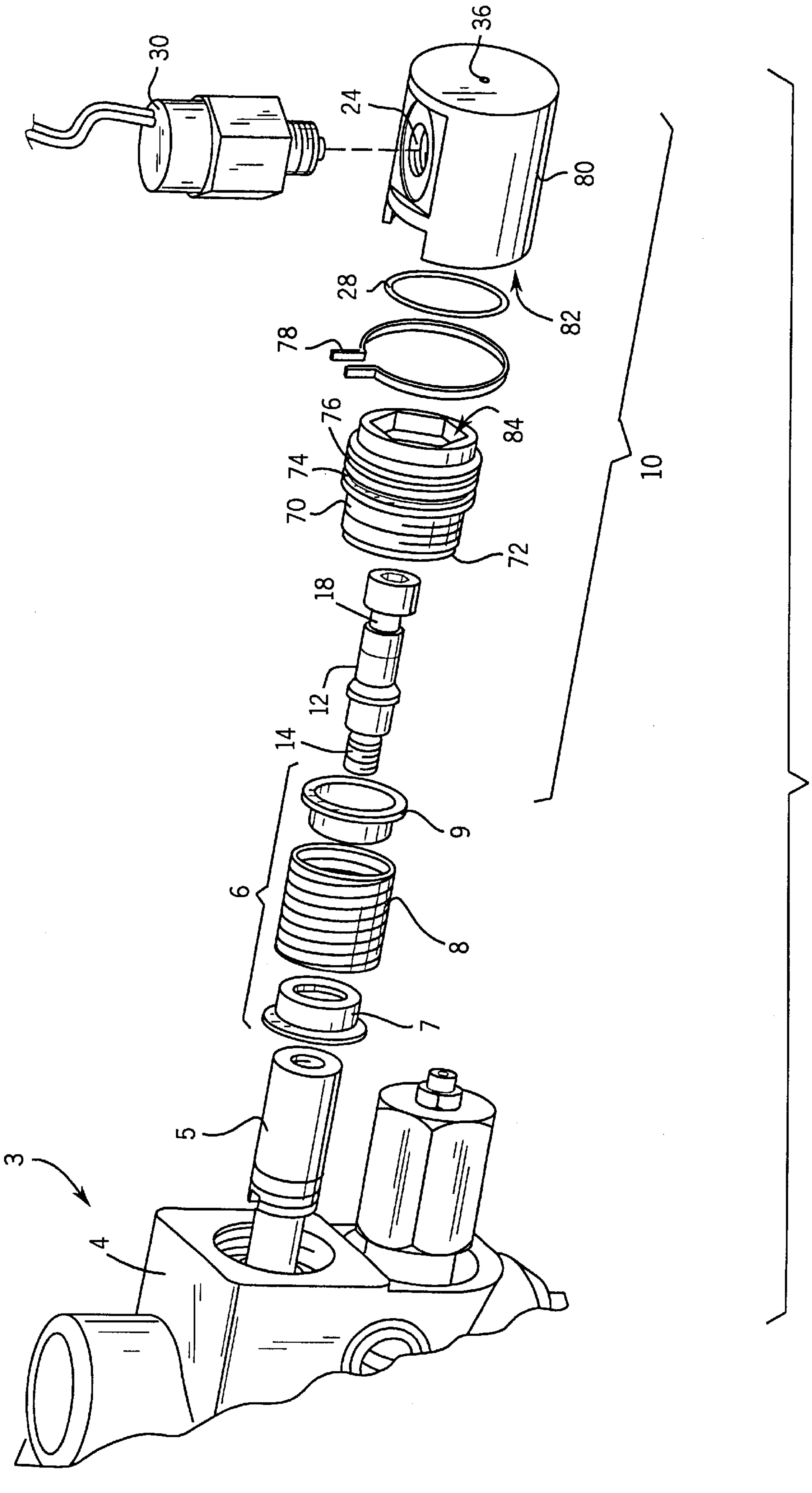
FIG. 4 is an exploded, perspective view of one embodiment of the interlock mechanism of the present invention, which interlock mechanism is attached by threadingly attaching an inner cap to the valve body and using a retainer ring to attach an outer cap that supports a solenoid.
Figure 6:
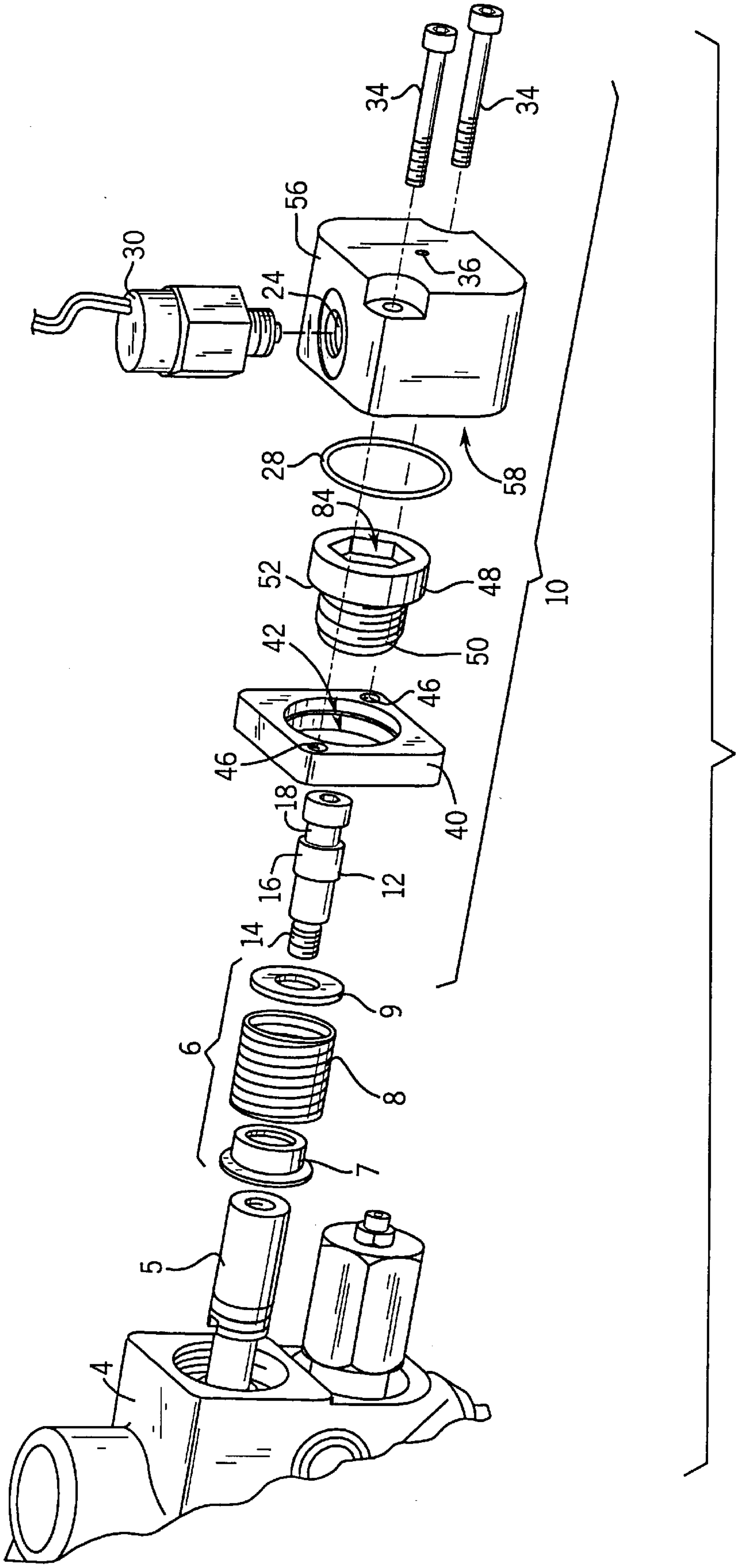
FIG. 6 is an exploded, perspective view of one embodiment of the interlock mechanism of the present invention, which interlock mechanism is attached by threadingly attaching an inner cap to the valve body, which supports a mounting plate used to mount a lock block that supports a solenoid.
Figure 7:
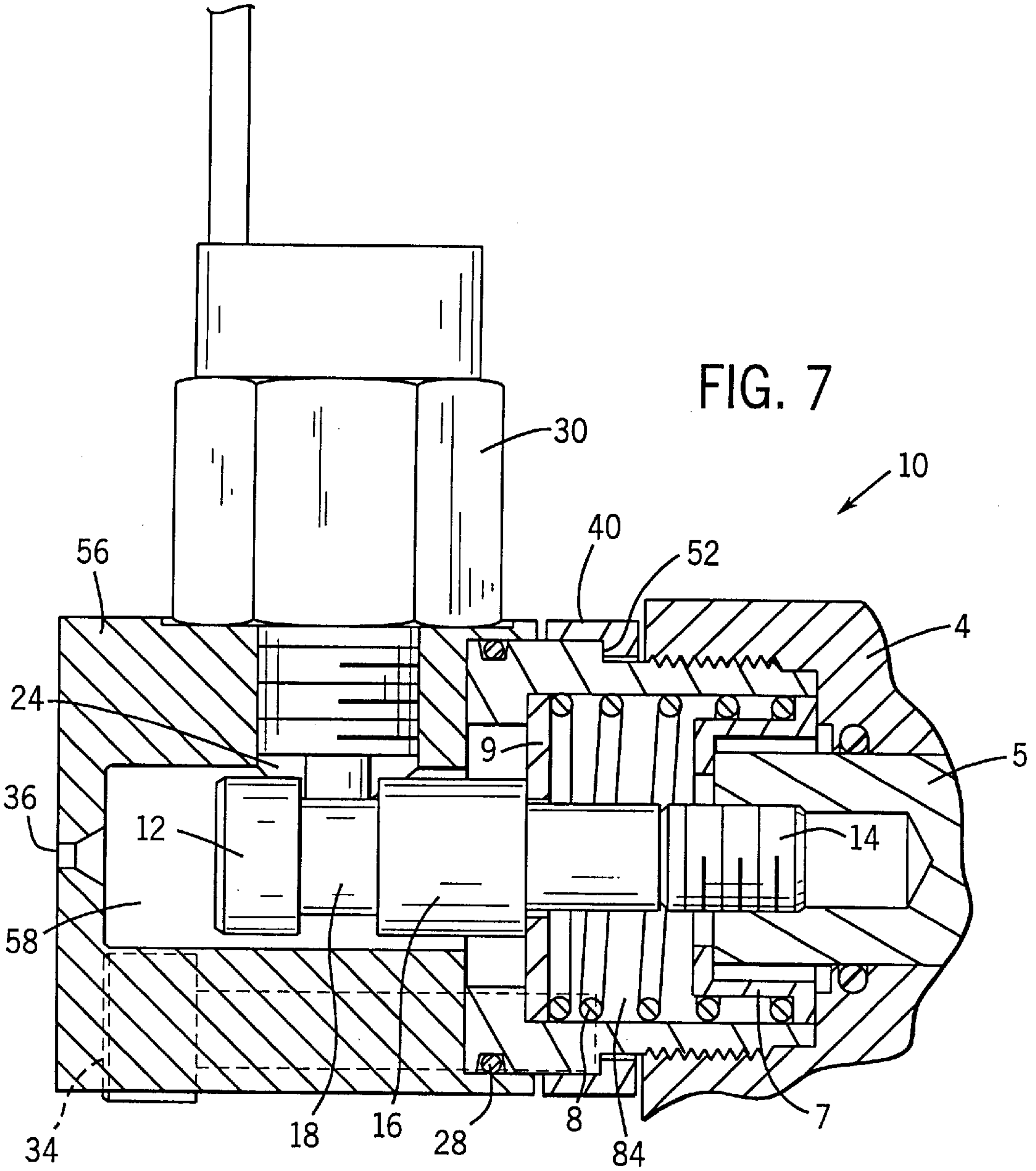
FIG. 7 is a side sectional view of the assembled and mounted interlock mechanism shown in FIG. 6.

Referring now to the drawings, FIG. 1 illustrates a work vehicle 1 having a vehicle support structure 90 to which a plurality of wheels 92 are rotatably attached. An engine 95 is mounted on the vehicle support structure 90 and is coupled to a transmission 94. The transmission 94 is coupled to two or more wheels 92 with a mounted backhoe attachment 2, such as an arm 97. The work vehicle shown is of the tractor type having four wheels with 2 or 4 wheel drive. However, the vehicle could also be an articulated vehicle or a tracked vehicle wherein wheels support the tracks. Various attachment functions of the work vehicle 1 are controlled by a control valve 3 that through a combination of fluid actuated connections and mechanical linkage, such as a hydraulic pump 96 and hydraulic actuator 98, manipulate the attachments. The backhoe attachment 2 extends and retracts the boom, dips and rotates the bucket and swings, left and right, during its various operations. Control of each movement is accomplished by manipulating a control valve 3. A control valve body 4 is mounted on the work vehicle 1 and typically each function is controlled by a separate control valve. FIGS. 2, 4 and 6 illustrate three separate embodiments to the present invention in an exploded perspective view. FIGS. 3, 5 and 7 illustrate a sectional side view of the respective embodiments in an assembled and mounted (to a control valve 3) on a valve body 4.

Referring to FIGS. 2 and 3, there is illustrated one embodiment of the present invention. The control valve spool 5 is reciprocally mounted in the control valve body 4. The control valve spool 5 typically moves in relation to fluid entering or leaving the various ports in the valve body 4 in response to action of the operator of the work vehicle 1. At certain times it is desirous to have the valve spool 5 in a neutral position. That is, the function of the attachment should not be operative and more importantly cannot be inadvertently activated by the operator of the work vehicle 1 or some other person. The present invention is a control valve lock 10 that will maintain the valve spool 5 in a selected position, neutral for instance, until the operator of the work vehicle 1 enacts a certain logic, such as sitting in the operator's seat.

The valve spool 5 is maintained in a position w;with a centering spring assembly 6 including a first spring cap 7, a spring 8 and a second spring cap 9. The two caps, 7 and 9, and spring 8 are coaxial and are formed to receive a detent rod 12 along their common axes. The rod 12 has a threaded portion 14 on one end and a spring retainer shoulder 16 that butts against centering spring assembly 6 as the rod 12 is threaded into and engages the valve spool 5. With the rod 12 threaded into the valve spool 5, the centering spring assembly 6 is in contact with the valve spool 5 on one end and the spring retainer shoulder 16 on the detent rod 12 on the other end. The rod 12 has a groove 18 near the end of the rod 12 opposite the threaded portion 14 of the rod 12.

A solenoid block 20 having a central bore 22 is formed to engage the valve body 4 and is coaxial with the valve spool 5. The central bore 22 is at least large enough to accommodate the rod 12 and centering spring assembly 6. The solenoid block 20 also is provided with a solenoid bore 24 orientated normal to and in communication with the central bore 22. A solenoid block 20 is removably mounted to the valve body 4 and aligned with the rod 12 in the central bore 22 using mounting bolts 34. The solenoid block can be made from any suitable material but should be compatible with the fluid used in the control valve 3, such as hydraulic fluid. The solenoid block can be fabricated in any conventional manner, such as casting or machining or some combination thereof. A fluid seal 28 between the solenoid block 20 and the valve body 4 maintains fluid integrity between the two pieces The fluid seal can be a gasket between the two facing surfaces of the valve body 4 and the solenoid block 20 or can be an O-ring mounted in a groove on the portion of the solenoid block 20 that engages the valve body 4.

A solenoid 30 having a pin is mounted in the solenoid bore 24 with the pin aligned to selectively engage the groove 18 of rod 12. When the solenoid 30 is energized by a suitable power source, the pin is moved towards the electrical coil in the solenoid 30 and out of the groove 18 in the rod 12. When the solenoid 30 is de-energized, a spring or other suitable biasing device associated with the solenoid extends the pin into the groove 18 of the rod 12 thereby locking the valve spool 5 in a fixed position, typically the neutral position. A solenoid shield 32 may be mounted on the solenoid block 20 and partially covering the solenoid 30 as protection from external forces. The solenoid shield 32 can be mounted in any convenient manner; however, the preferred embodiment utilizes the mounting bolts 34 that attach the solenoid block 20 to the valve body 4. A fluid seal can be provided between the facing surfaces of the solenoid shield 32 and the solenoid block 20. The solenoid block 20 can also be provided with a check valve grommet 36 in fluid communication with the central bore 22 of the solenoid block 20 to allow fluid out of the central bore 22 when necessary. The preferred embodiment has the check valve 36 in coaxial alignment with the central bore 22. A control switch 38 is in operative communication with the solenoid to selectively operate the solenoid by energizing or de-energizing the solenoid 30 as determined by the operator of the work vehicle 1. The control switch 38 can be a manually operated switch, a seat switch or some other logical sequence that provides selective control by the operator of the work vehicle of the particular function to which the control valve lock 10 is associated.

Referring now to FIGS. 4 and 5 which illustrate another embodiment of the present invention, in this embodiment an inner cap 70 configured to threadingly engage the valve body 4 coaxially with the valve spool 5, has a central bore 22 and is provided with an external retainer ring groove 74. The threaded portion 72 of the inner cap 70 mates with corresponding threads in the valve body 4. Most valve bodies have a threaded portion to allow access to the valve spools. A rod 12 engaged at one end with the valve spool 5 is provided with a groove 18 at its other end. The rod 12 maintains a centering spring assembly 6 in contact with the valve spool 5 and extends through the central bore 22 of the inner cap 70. The centering spring assembly 6 is as previously described above and is maintained coaxially with the valve spool 5 by the spring retainer shoulder 16 on the rod 12. An outer cap 80 configured to removably cover the inner cap 70 has an inner bore 84 at least large enough to accommodate the inner cap 70. The outer cap 80 is provided with an interior retainer ring groove 82 corresponding to the external retainer ring groove 74 in the inner cap 70. A retainer ring 78 fits in both grooves 74, 82 to attach the outer cap 80 to the inner cap 70. The detail of such engagement is shown in FIG. 5A. In operation, the retainer ring 78 is compressed and nests in the exterior retainer ring groove 74 of the inner cap 70 while the outer cap is placed over the inner cap thereby covering it. When the retainer ring 78 is relaxed, a portion of the retainer ring 78 engages the interior ring groove 82 in the outer cap 80 so that a portion of the retainer ring 78 is in both such grooves 74, 82. In such configuration, the outer cap is mounted over the inner cap. The outer cap is provided with a solenoid bore 24 oriented normal to and in communication with the inner bore 84 of the outer cap 80 and the central bore 22 of the inner cap 70. A fluid seal 28 can be provided between the inner cap 70 and the outer cap 80 to maintain the fluid integrity of the valve body 4. The preferred embodiment of the present invention uses an O-ring for the seal which is mounted in a seal groove 76 on the exterior of the inner cap 70. A solenoid 30 having a pin is mounted in the solenoid bore 24 of the outer cap 80 with the pin aligned to selectively engage the groove 18 of the rod 12. The operation of this embodiment of the control valve lock 10 of the present invention is as described above. The outer cap 80 may also be provided with a one-way check valve 36 mounted coaxially and in communication with the inner bore 84 of the outer cap 80 to allow fluid out of the inner bore 84. A control switch 38 which is in operative communication with the solenoid 30 to selectively operate the solenoid may also be provided and operate as previously described.

Referring now to FIGS. 6 and 7 which illustrate another embodiment of the present invention, in this embodiment an inner cap 48 configured to threadingly engage the valve body 4 coaxially with the valve spool 5 is provided with a central bore 22 and a mounting plate shoulder 52. The threaded portion 50 of the inner cap 48 engages the valve body. A mounting plate 40 having a through bore 22 at least large enough to receive the inner cap 48 up to the mounting plate shoulder 52 is positioned between the valve body 4 and the inner cap 48. As the inner cap 48 is threaded into valve body 4, the mounting plate 40 is supported by the inner cap 48. The mounting plate 40 is provided with at least one threaded hole for securing a lock block 56. Threaded fasteners engaging the mounting plate 40 through the holes in the lock block 56 cause the mounting plate 40 and the lock block 56 to clamp around the inner cap 48 thereby securing them in place. A rod 12 engaged at one end with the valve spool 5 is provided with a groove 18 at its other end. The rod 12 maintains a centering spring assembly 6 in contact with the valve spool 5 and extends through the central bore 22 of the inner cap 48. A lock block 56 having a cavity 58 at least large enough to receive the inner cap 48 and the coaxially detent rod 12 is attached to the mounting plate 40 with at least one fastener 34 engaging the threaded hole 46 of the mounting plate 40. The lock block 56 is also provided with a solenoid bore 24 oriented normal to and in communication with the interior cavity 48. A solenoid 30 having a pin mounted in the solenoid bore 24 with the pin aligned to selectively engage the groove 18 in the rod 12. The present invention may also be provided with a fluid seal 28 mounted in a seal groove 76 on the inner cap 48 between the inner cap 48 and the lock block 56. The lock block 56 may also be provided with a one-way check valve 36 in communication with and coaxial with the interior cavity 58 to only allow fluid out of the cavity 58. A control switch 38 in operative communication with the solenoid 30 to selectively operate the solenoid may also be provided and operated as previously described. The fabricating of the lock block 56 can be in any conventional method, such as casting, machining or a combination thereof, and can be manufactured in any convenient material provided such material is compatible with the fluid used in the control valve 3, such as hydraulic fluid.

Thus, it should be apparent that it has been provided in accordance with the present invention of a work vehicle having a fluid actuated and mechanically linked attachment, which attachment is operatively connected to a valve having a control valve spool reciprocally mounted in the control valve body and having a control valve lock mounted thereon, which control valve lock mounted thereon which control valve lock is selectively controlled by the operator of the work vehicle has been disclosed. Although the invention has been described in conjunction with specific embodiments thereof, it is evident that many alternatives, modifications, and variations will be apparent to those ordinarily skilled in the art. Accordingly, it is intended to embrace all such alternatives, modifications and variations that fall within the spirit and scope of the appended claims.

What is claimed is:

1. A hydraulic control valve lock mounted on a control valve body having a control valve spool, the hydraulic control valve lock comprising:

a rod engaged at one end with the valve spool and having a groove at another end, with the rod maintaining a centering spring assembly in contact with the valve spool;

a solenoid block having a central bore at least large enough to accommodate the rod and a solenoid bore orientated normal to and in communication with the central bore, the solenoid block removably mounted to the valve body and aligned with the rod in the central bore; and a solenoid having a pin mounted in the solenoid bore with the aligned to selectively engage the groove in the rod.

2. The control valve lock of claim 1, including a solenoid shield mounted on the solenoid block and partially covering the solenoid.

3. The control valve lock of claim 1, including a one-way check valve mounted on the solenoid block and in communication with the central bore to only allow fluid out of the central bore.

4. The control valve lock of claim 1, including a fluid seal mounted between the valve body and the solenoid block.

5. The control valve lock of claim 2, including a fluid seal mounted between the valve body and the solenoid block and a second fluid seal mounted between the solenoid block and the solenoid shield.

6. The control valve lock of claim 1, including a control switch in operative communication with the solenoid to selectively operate the solenoid.

7. A hydraulic control valve lock mounted on a control valve body having a control valve spool, the hydraulic control valve lock comprising:

an inner cap configured to threadingly engage the valve body coaxially with the valve spool, the inner cap having a central bore and an external retainer ring groove;

a rod engaged at one end with the valve spool and having a groove at another end, with the rod maintaining a centering spring assembly in contact with the valve spool and extending through the central bore of the inner cap;

an outer cap configured to removably cover the inner cap, the outer cap having an inner bore at least large enough to accommodate the inner cap and an interior retainer ring groove corresponding to the external retainer ring groove in the inner cap, the outer cap further having a solenoid bore orientated normal to and in communication with the inner bore;

a retainer ring configured to removably engage both the external retainer ring groove of the inner cap and the interior retainer ring groove of the outer cap; and a solenoid having a pin mounted in the solenoid bore with the pin aligned to selectively engage the groove in the rod.

8. The control valve lock of claim 7, including a one-way check valve mounted on the outer cap and in communication with the inner bore to only allow fluid out of the inner bore.

9. The control valve lock of claim 7, including a fluid seal mounted between the inner cap and the outer cap.

10. The control valve lock of claim 7, including a control switch in operative communication with the solenoid to selectively operate the solenoid.

11. A hydraulic control valve lock mounted on a control valve body having a control valve spool, the hydraulic control valve lock comprising:

an inner cap configured to threadingly engage the valve body coaxially with the valve spool, the inner cap having a central bore and mounting plate shoulder;

a mounting plate having a through-bore at least large enough to receive the inner cap up to the mounting plate shoulder and the mounting plate having at least one threaded hole, with the mounting plate supported between the valve body and the mounting plate shoulder of the inner cap when the inner cap is engaged with the valve body;

a rod engaged at one end with the valve spool and having a groove at another end, with the rod maintaining a centering spring assembly in contact with the valve spool and extending through the central bore of the inner cap;

a lock block having a cavity at least large enough to receive the inner cap and a solenoid bore orientated normal to and in communication with the cavity, with the lock block attached to the mounting plate with at least one fastener engaging the threaded hole; and a solenoid having a pin mounted in the solenoid bore with the pin aligned to selectively engage the groove in the rod.

12. The control valve lock of claim 11, including a one-way check valve mounted on the lock block and in communication with the cavity to only allow fluid out of the cavity.

13. The control valve lock of claim 11, including a fluid seal mounted between the inner cap and the lock block.

14. The control valve lock of claim 11, including a control switch in operative communication with the solenoid to selectively operate the solenoid.

15. A hydraulic control valve lock mounted on a control valve body having a control valve spool, the hydraulic control valve lock comprising:

a means for engaging a valve spool;

a means for biasing the valve spool into a selected position;

a means for maintaining the valve spool in the selected position;

a means for supporting the means for maintaining the valve spool in the selected position; and a means for mounting the means for supporting on the valve body.

16. The control valve lock of claim 15, including a means for shielding the means for maintaining.

17. The control valve lock of claim 15, wherein the means for biasing is a centering spring assembly comprising: a first cup washer sized to engage the valve spool and maintain contact with the valve body, the first cup washer having a center hole, a spring aligned with and engaging the first cup washer and a second cup washer having a center hole aligned with and engaging the spring at another end such that the spring forces the two cup washers away from each other as the spring relaxes.

18. The control valve lock of claim 17, wherein the means for engaging the valve spool is a rod threadingly attached to the valve spool, with the rod having a groove and with the rod passing through the centering spring assembly.

19. The control valve lock of claim 15, wherein the means for maintaining the valve spool in the selected position is a power actuator.

20. The control valve lock of claim 19, wherein the power actuator is selected from a group consisting of a hydraulic cylinder and pin, a solenoid and pin, an air cylinder and pin, and a cable and pin.

21. The control valve lock of claim 15, wherein the means for supporting is a member having a central bore at least large enough to accommodate the means for engaging the spool bore and an actuator bore normal to and in communication with the central bore, the member removably mounted to the valve body and aligned with the means for engaging the valve spool in the central bore.

22. A work vehicle comprising:

a vehicle support structure;

a plurality of wheels rotatably attached to the support structure;

a transmission coupled to the wheels;

an engine coupled to the transmission;

a hydraulic pump coupled to the engine;

an arm pivotally attached to the support structure;

a hydraulic actuator coupled to the arm to import motion to the arm;

a control valve having a control valve spool in fluid communication with the hydraulic pump and hydraulic actuator; and a control valve lock mounted on the control valve, the control valve lock comprising:

a means for engaging a valve spool;

a means for biasing the valve spool into a selected position;

a means for maintaining the valve spool in the selected position;

a means for supporting the means for maintaining the valve spool in the selected position; and a means for mounting the means for supporting on the valve body.

23. The vehicle of claim 22, wherein the arm is an arm of a backhoe.

24. The vehicle of claim 22, wherein the hydraulic actuator is a hydraulic cylinder.

25. The vehicle of claim 22, wherein the hydraulic actuator is a hydraulic motor.

* * * * *